Oct. 15, 1968 D. SCARAMUCCI 3,405,909
VALVE CONSTRUCTION INCLUDING DIFFERENTIAL AREA SEALS
Filed April 4, 1966 2 Sheets-Sheet 1

INVENTOR.
DOMER SCARAMUCCI
BY
Dunlap and Laney
ATTORNEYS

Oct. 15, 1968          D. SCARAMUCCI          3,405,909

VALVE CONSTRUCTION INCLUDING DIFFERENTIAL AREA SEALS

Filed April 4, 1966          2 Sheets-Sheet 2

INVENTOR.
DOMER SCARAMUCCI
BY
Dunlap and Laney
ATTORNEYS

United States Patent Office 3,405,909
Patented Oct. 15, 1968

3,405,909
VALVE CONSTRUCTION INCLUDING
DIFFERENTIAL AREA SEALS
Domer Scaramucci, 3245 S. Hattie,
Oklahoma City, Okla. 73129
Continuation-in-part of application Ser. No. 487,682,
Sept. 16, 1965. This application Apr. 4, 1966, Ser.
No. 540,015
8 Claims. (Cl. 251—148)

ABSTRACT OF THE DISCLOSURE

A valve including a housing having an opening therethrough and a valve body positioned in a cavity in the housing. Positioned in contact with the valve body and housing, and extending partially into a bore through the body, are one or a pair of movable seal structures which are so configured and arranged that, upon expansion of the housing, as by excessive internal pressure, the seal structures move in response to fluid pressure within the valve body to remain in sealing contact with the expanded housing, and with the valve body. A movable valve member is provided in the valve body for opening and closing the valve, and each seal structure carries a seal member which sealingly engages the valve member during operation of the valve. The housing and its cavity are constructed so that the housing can be permanently connected in a fluid circuit, and the valve body, valve member and seal structure quickly and easily removed therefrom and replaced therein at any time.

---

This is a continuation-in-part of my copending application Ser. No. 487,682 filed Sept. 16, 1965.

This invention relates generally to improved valves for use between sections of conduit. More particularly, but not by way of limitation, this invention relates to an improved valve including a valve housing connected between sections of conduit and means in said valve responsive to fluid pressure in the valve for maintaining a constant seal between the valve housing and valve body.

The advantage of constructing the valve having a valve housing permanently mounted in the conduit has been recognized in the past. For example, the primary advantage gained is the ability to quickly and easily remove the valve body and seals from the valve housing in the minimum of time and with a minimum of effort while maintaining the fixed relationship of the sections of conduit connected to the valve housing.

Perhaps the biggest disadvantage of such a valve structure has been the tendency of the valve housing to elongate under the influence of fluid pressure in the valve until fluid leaks between the valve body and the valve housing. Various approaches have been taken in an attempt to alleviate this problem. The most common approach has been to increase the wall thickness of the valve housing until it is of sufficient thickness to withstand any anticipated internal pressure without elongation or deformation.

Manifestly, the increased thickness in the valve housing adds weight and considerable cost to the valve. In fact, the cost has increased until such valves are not competitive with the more common forms of valves that will serve generally the same purposes.

This invention provides an improved valve connectable between sections of conduit comprising a valve housing having an opening extending therethrough and a cavity therein intersecting the opening, each end of the opening being arranged for connection to the conduit, the cavity forming a pair of opposed surfaces; a valve body disposed in the cavity between the opposed surfaces, the body having a bore extending therethrough substantially in axial alignment with the opening and having a pair of end faces intersecting the bore and disposed generally parallel to the opposed surfaces; a valve member in the bore movable between a position wherein the bore is open and a position wherein the bore is closed; first seal means encircling a portion of the bore and sealingly engaging one of the opposed surfaces and the valve body; and, second seal means encircling a portion of the bore and having a portion thereon slidingly and sealingly disposed therein, the second seal means also sealingly engaging the other opposed surface in the housing along a circumference having a diameter smaller than the diameter of the bore, whereby the second seal means and the valve body are biased by fluid pressure in the valve body relatively toward the respective, adjacent opposed surface to maintain the first and second seal means in constant sealing engagement with the opposed surfaces in the housing.

One object of this invention is to provide an improved valve including a valve housing mounted between sections of conduit that effectively prevents leakage of fluid from the valve in the event that the valve housing should elongate.

Another object of the invention is to provide an improved valve including a valve housing mounted between sections of conduit that can be economically manufactured.

A further object of the invention is to provide an improved valve incorporating means for effecting a fluid tight closure of the valve while simultaneously avoiding leakage of fluid from the valve should fluid pressure in the valve elongate the valve housing.

A further object of the invention is to provide an improved valve incorporating sealing means therein that is responsive to fluid pressure in the valve to effectively maintain a seal between the valve body and the valve housing even though elongation of the valve housing should occur.

The foregoing and additional objects and advantages of the invention will become more apparent as the following detailed description is read in conjunction with the accompanying drawings wherein like reference characters denote like parts in all views and wherein.

Figures 1, 2:
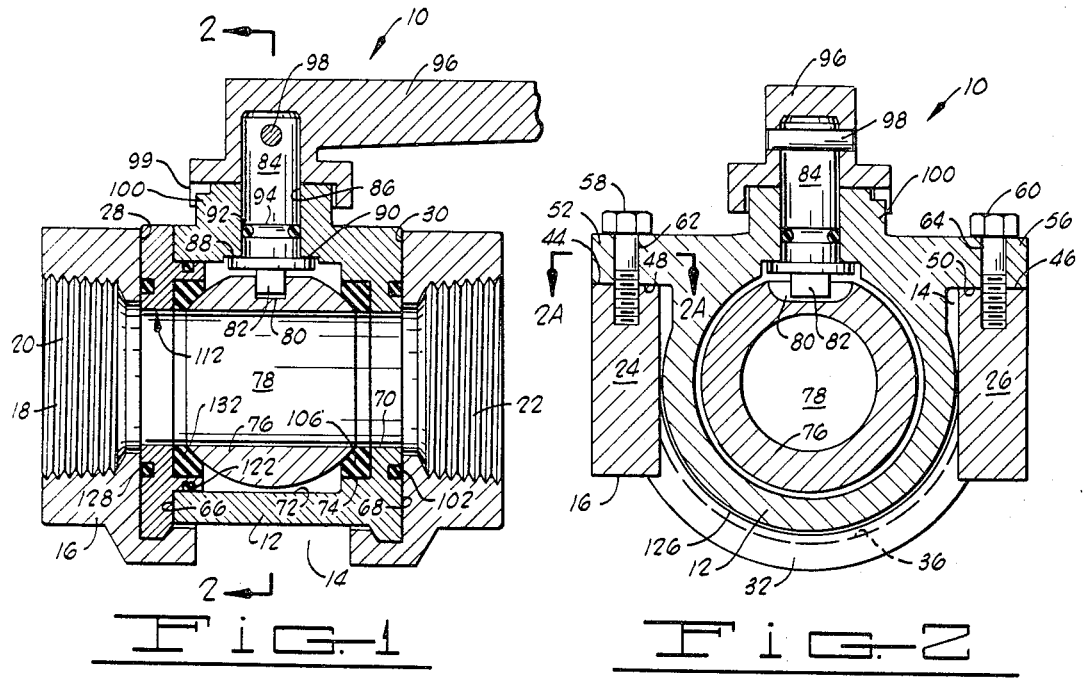
FIG. 1 is a vertical cross-sectional view of a ball valve constructed in accordance with the invention.
FIG. 2 is a transverse cross-sectional view taken substantially along the line 2—2 of FIG. 1.

Embodiment of FIG. 1

Referring to the drawing and to FIG. 1 in particular, shown therein and generally designated by the reference character 10 is a ball valve constructed in accordance with the invention. The valve 10 includes a valve body 12 disposed within a cavity 14 formed in the valve housing 16.

The valve housing 16 is a unitray member having an opening 18 extending therethrough. Each end of the opening 18 is threaded, as illustrated at 20 and 22 or otherwise suitably arranged, providing for the connection of the valve housing 16 between sections of conduit (not shown). A pair of elongated side portions 24 and 26 (see FIG. 2) define the sides of the cavity 14. The ends of the cavity 14 are defined by opposed surfaces 28 and 30 that are disposed substantially perpendicularly to the opening 18.

Figures 3, 4:
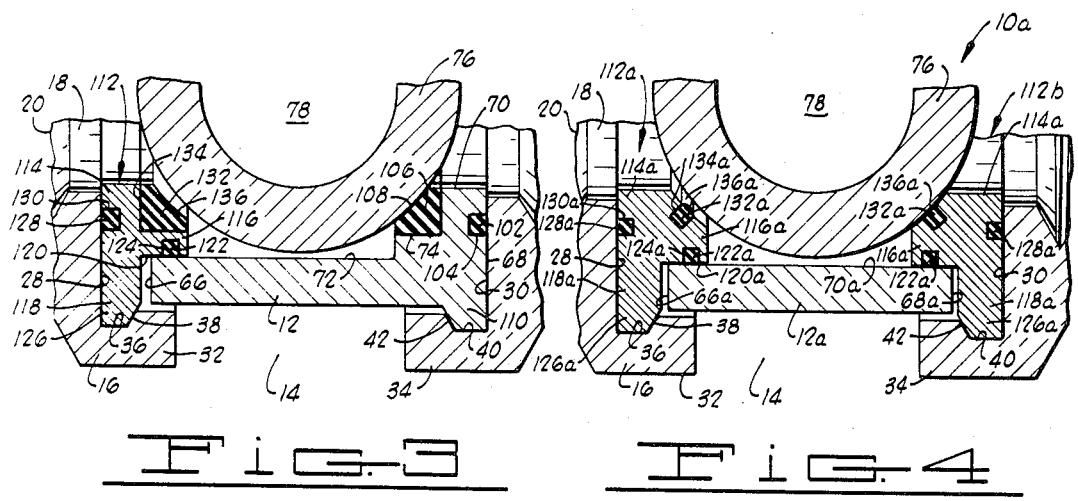
FIG. 3 is an enlarged, fragmentary cross-sectional view of the valve of FIG. 1, but showing the various components thereof when the valve housing has elongated and the valve member has shifted relatively downstream.
FIG. 4 is an enlarged, fragmentary cross-sectional view illustrating another embodiment of ball valve also constructed in accordance with the invention.

As illustrated most clearly in FIGS. 2 and 3, the valve housing 16 also includes a pair of arcuate portions 32 and 34 that extend into the cavity 14 from the opposed surfaces 28 and 30, respectively. The arcuate portion 32 includes an arcuate recess 36 having a beveled surface 38 thereon that generally faces the surface 28. The arcuate portion 34 includes an arcuate recess 40 having a beveled surface 42 thereon that generally faces the surface 30. The purposes of the recesses 36 and 40 and the beveled surfaces 38 and 42 will be described more fully hereinafter.

As shown in FIG. 2, the side portion 24 has an upwardly facing surface 44 thereon and the side portion 26 has an upwardly facing surface 46 thereon. The purpose of the upwardly facing surfaces 44 and 46 is to engage mating, downwardly facing surfaces 48 and 50 formed on lug portions 52 and 56, respectively, that comprise a portion of the valve body 12.

Figure 2A:
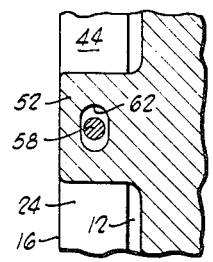
FIG. 2A is a fragmentary cross-sectional view taken substantially along the line 2A—2A of FIG. 2.

A pair of threaded fasteners 58 and 60 extend through slots 62 and 64 (shown more clearly in FIG. 2A) that are formed in the lug portions 52 and 56, respectively. As can be perceived from viewing FIGS. 2 and 2A, the threaded fasteners 58 and 60 retain the value body 12 in the housing 16 while the slots 62 and 64 permit movement of the valve body 12 relative to the fasteners 58 and 60 and relative to the valve housing 16.

Referring again to FIG. 1, the valve body 12 includes an end face 66 facing the surface 28 on the housing 16, an end face 68 that is in engagement with the surface 30 in the housing 16, and a bore 70 that extends through the body 12 intersecting the end faces 66 and 68. An enlarged counterbore 72 extends partially through the valve body 12 from the end face 66. An annular recess 74 encircles the bore 70 adjacent the termination of the counterbore 72.

A valve member 76, which is illustrated as being of spherical configuration, is positioned in the counterbore 72. The valve member 76 has a port 78 extending therethrough in alignment with the opening 18 in the housing 16 and the bore 70 in the valve body 12.

The exterior of the valve member 76 is provided with a rectangular recess 80 that is arranged to receive the lower rectangular end 82 of a valve operating member 84. As is shown more clearly in FIG. 2, the rectangular recess 80 is longer than the longest dimension of the rectangular end 82 to permit movement of the valve member 76 relatively along the bore 70 when the valve member 76 is in the closed position as illustrated in FIG. 3.

The valve operating member 84 is disposed in an opening 86 that extends transversely through the valve body 12 intersecting the counterbore 72. The valve operating member 84 includes an annular flange 88 that is in engagement with a downwardly facing surface 90 in the valve operating member 84 relative to the valve body 12. An O-ring seal 92 is located in an annular groove 94 in the valve operating member 84 and is disposed in sealing engagement with the valve body 12 in the opening 86.

The upper end of the valve operating member 84 is connected with an operating handle 96 by a pin 98. The handle 96 includes a lug 99 that is engageable with a pair of spaced lugs 100 (only one is shown in FIG. 1) on the valve body 12 to limit the rotation of the operating handle 96 and the interconnected valve member 76 to approximately 90 degrees.

As is shown more clearly in FIG. 3, an O-ring seal 102 is disposed in an annular recess 104 formed in the end face 68 of the valve body 12. The O-ring seal 102 is in sealing engagement with the surface 30 in the housing 16.

An annular seal member 106 is disposed in the annular recess 74 in the valve body 12. The seal member 106 has a surface 108 thereon that is arranged to sealingly engage the exterior surface of the valve member 76.

A beveled arcuate shoulder portion 110 is formed on the valve body 12 and is disposed in the recess 40 formed in the housing 16. As clearly shown in FIG. 3, the beveled arcuate shoulder 110 has a surface thereon in engagement with the beveled surface 42 in the recess 40 so that positioning the valve body 12 in the cavity 14, biases the O-ring seal 102 into sealing engagement with the surface 30 on the valve housing 16.

As shown in FIG. 1, and more clearly in FIG. 3 the valve 10 also includes a seal assembly 112 disposed between the upstream end face 66 of the valve body 12 and the surface 28 on the housing 16. The seal assembly 112 includes a seal body 114 having an axial flange portion 116 disposed in the counterbore 72 and a radially extending flange portion 118 disposed between the end face 66 on the valve body 12 and the surface 28 on the valve housing 16.

The axial flange portion 116 includes an outer periphery 120 sized to slidingly fit in the counterbore 72. An O-ring seal 122 is disposed in a recess 124 located in the axial flange portion 116 adjacent the outer periphery 120 thereof. The O-ring seal 122 is in sliding and sealing engagement with the valve body 12 in the counterbore 72.

The radially extending flange portion 118 includes a beveled arcuate portion 126 that is disposed in the recess 36 in the valve housing 16. The arcuate portion 126 on the seal body 114 is in engagement with the beveled surface 38 on the valve housing 16, biasing the seal body 114 relatively toward the surface 28 in the valve housing 16.

An O-ring seal 128 is disposed in an annular recess 130 formed in the seal body 114 adjacent the surface 28 on the valve housing 16. As clearly shown in FIG. 3, the diameter of the O-ring seal 128 is less than the diameter of the outer periphery 120 of the axial flange portion 116 and thus is smaller than the diameter of the counterbore 72.

An annular seal member 132 is disposed in an annular recess 134 in the seal body 114. The annular seal member 132 includes a surface 136 thereon that is arranged to sealingly engage the exterior surface of the valve member 76.

Operation of the embodiment of FIG. 1

When the valve body 12 and the assembled seal assembly 112 are inserted in the cavity 14 of the valve housing 16, the beveled surfaces on the arcuate shoulder portions 110 and 126 of the valve body 12 and the seal assembly 112, respectively, engage the beveled surfaces 38 and 42 in the valve housing 16. The engagement therebetween forces the end face 68 of the valve body 12 and the O-ring seal 102 carried thereby into engagement with the surface 30 in the valve housing 16. Also, the engagement forces the seal assembly 112 and the O-ring seal 128 carried thereby into sealing engagement with the surface 28 in the valve housing 16.

The threaded fasteners 58 and 60 are inserted through the slots 62 and 64, pulling the surfaces 48 and 50 on the valve body 12 into engagement with the upwardly facing surfaces 44 and 46 on the valve housing 16 thereby retaining the valve body and seal assembly 112 in the valve housing 16. When the valve 10 is initially assembled with no internal pressure therein, the various components are sized so that the annular seal members 106 and 132 are in engagement with the valve member 76 retaining the valve member 76 in a relatively centered position as illustrated in FIG. 1.

With the valve 10 in the open position as illustrated in FIG. 1, the port 78 in the valve member 76 is aligned with the opening 18 extending through the valve housing 16 thereby permitting fluid flow therethrough. Due to the initial sealing engagement of the annular seal members 106 and 132 with the exterior of the valve member 76, it is not likely that fluid flow through the valve 10 will enter the counterbore 72.

However, in the event that the fluid pressure in the system should become sufficiently high to elongate the valve housing 16, as illustrated in FIG. 3, the O-ring seal 102 in the end face 68 of the valve body 12 is maintained in sealing engagement with the surface in the valve housing 16. The sealing engagement results from the mechanical engagement of the beveled surface 42 on the valve housing with the arcuate shoulder portion 110 on the valve body 12 as previously described. Also, fluid pressure in the valve 10 acts on the differential area of the valve body 12, as defined by the O-ring seal 122 in the valve assembly 112 and the O-ring seal 102 in the valve body 12 to augment the mechanical holding force.

The O-ring seal 128 in the seal assembly 112 is maintained in sealing engagement with the surface 28 and the valve housing 16 due to the mechanical engagement of the seal assembly 112 with the beveled surface 38 on the valve housing 16 as previously described and due to the differential area defined on the seal assembly 112 by the O-ring seals 122 and 128. Thus, it can be appreciated that, if elongation of the valve housing 16 occurs when the valve 10 is in the open position, no fluid can escape from the valve 10 due to the sealing engagement between the O-ring seals 102 and 128 with the valve housing 16 and due to the sealing engagement of the O-ring seal 122 with the valve body 12 in the counterbore 72.

When the valve member 76 is rotated to the closed position (see FIG. 3), that is, to the position wherein the port 78 extending therethrough is disposed at a right angle to the bore 70 extending through the valve body 12, fluid pressure in the upstream end 20 of the opening 18 exerts a force on the valve member 76, moving the valve member 76 relatively downstream and into engagement with the surface 108 on the annular seal member 106. The engagement of the valve member 76 with the annular seal member 106 forms a fluidtight downstream seal in the valve 10 affording complete closure thereof.

If the fluid pressure in the valve 10 becomes sufficiently high to elongate the valve housing 16, the O-ring seal 102 in the valve body 12 remains in engagement with the surface 30 in the valve housing 16 as previously described to prevent the escape of fluid between the valve body 12 and the surface 30 on the valve housing 16. Also, fluid pressure in the valve 10 exerts a force on the seal assembly 112 to maintain the O-ring seal 128 carried thereby in sealing engagement with the surface 28 on the valve housing 16. As previously mentioned, the engagement of the arcuate flange portion 126 on the seal assembly 12 with the beveled surface 38 on the valve housing 16 also aids in maintaining the seal 128 in engagement with the surface 28. From the foregoing, it can be appreciated that the described arrangement of the valve body 12, the valve housing 16 and the seal assembly 112 is effective to prevent the escape of fluid from the valve 10 if elongation of the housing 16 occurs, regardless of the position of the valve member 76.

It should also be pointed out that the elongation of the valve housing 16 generally occurs in the side portions 24 and 26 thereof. Thus, it is necessary to provide for some relative movement between the side portions 24 and 26 of the valve housing 16 and the valve body 12. Such relative movement, even though small, is compensated for by the provision of the slots 62 and 64. As can be appreciated from viewing FIG. 2A, the valve body 12 can move relatively with the elongation of the valve housing 16. Thus, the end face 68 on the valve body 12 is maintained in engagement with the surface 30 on the valve housing 16.

*Embodiment of FIG. 4*

The fragmentary cross-sectional view of FIG. 4 illustrates another embodiment of ball valve that is generally designated by the reference character 10a and also constructed in accordance with the invention. Various parts of the valve 10a are identical to parts previously described in connection with the valve 10 and the identical parts will be designated by the same reference characters. As shown therein, the valve 10a includes a valve body 12a disposed in the cavity 14 formed in the valve housing 16.

The valve body 12a includes an end face 66a facing the surface 28 on the valve housing 16, an end face 68a facing the surface 30 on the valve housing 16, and a bore 70a that extends therethrough intersecting the end faces 66a and 68a.

The valve member 76, which is illustrated as being spherical in configuration, is disposed in the bore 70a of the valve body 12a. The valve member 76 is provided with the port 78 that extends therethrough. It will be understood that the valve 10a also includes the necessary operating components connected with the valve member 76 as previously described in connection with FIG. 1.

As clearly shown in FIG. 4, the valve 10a includes an upstream seal assembly 112a and a downstream seal assembly 112b. The seal assemblies 112a and 112b are identically constructed though oppositely disposed in the valve 10a. In view of their identical construction, only the upstream seal assembly 112a will be described in detail, it being understood that like reference characters refer to like parts in the downstream seal assembly 112b.

The seal assembly 112a includes a seal body 114a having an axial flange portion 116a disposed in the bore 70a and a flange portion 118a extending radially outwardly between the end face 66a on the valve body 12a and the surface 28 on the valve housing 16. The axial flange portion 116a includes an outer periphery 120a sized to slidingly fit within the bore 70a. An O-ring seal 122a is disposed in an annular recess 124a located in the axial flange portion 116a adjacent the periphery 120a thereof. The O-ring seal 122a is in sliding and sealing engagement with the valve body 12a in the bore 70a.

The flange portion 118a includes an arcuate portion 126a having a beveled surface thereon in engagement with the beveled surface 38 in the recess 36 formed in the valve housing 16. An O-ring seal 128a is disposed in an annular recess 130a formed in the seal body 114a adjacent the surface 28 on the valve housing 16. The seal 128a is located relatively close to the end 20 of the opening 18 that extends through the valve housing 16 and is of smaller diameter than the O-ring seal 122a, that is, of smaller diameter than the bore 70a.

An annular seal member 132a is disposed in an annular recess 134a formed in the seal body 114a adjacent the exterior of the valve member 76. As clearly shown in FIG. 4, the annular seal member 132a includes a surface 136a arranged to sealingly engage the exterior surface of the valve member 76.

The downstream seal assembly 112b has its axial flange portion 116a disposed in the bore 70a with the O-ring seal 122a carried thereby in sliding and sealing engagement with the valve body 12a in the bore 70a. Also, the flange portion 118a thereon is disposed between the end face 68a on the valve body 12a and the surface 30 on the valve housing 16.

The arcuate portion 126a on the downstream seal assembly 112b is disposed in the recess 40 formed in the valve housing 16 and has the beveled shoulder thereon in engagement with the beveled surface 42 in the valve housing 16, whereby the downstream seal assembly 112b is biased toward the surface 30 on the valve housing 16. Thus, the O-ring seal 128a carried by the downstream seal assembly 112b is in sealing engagement with the surface 30. Also, the surface 136a on the annular seal member 132a in the downstream assembly 112b is disposed in sealing engagement with the exterior surface of the valve member 76.

Operationally, the valve 10a functions very similarly to the previously described valve 10. When the valve body 12a and the seal assemblies 112a and 112b are inserted in the valve housing 16, the beveled shoulders on the arcuate portions 126a of the seal assemblies 112a and 112b enter the recesses 36 and 40 in the valve body 12 and engage the beveled surfaces 38 and 42 therein, biasing the seal assemblies 112a and 112b relatively apart and toward the surfaces 28 and 30 on the valve housing 16. Thus, the initial assembly of the valve 10a places the O-ring seals 128 in sealing engagement with the surfaces 28 and 30 on the valve housing 16.

With the valve 10a in the open position, that is, with the port 78 extending through the valve member 76 in alignment with the opening 18, fluid flows through the valve 10a. When in this position, the valve member 76 is engaged by the annular seal members 132a to retain the valve member 76 in a centered position not shown in the valve body 12a.

If the fluid pressure in the valve 10a increases to a sufficiently high value, the valve housing 16 is elongated to the position illustrated in FIG. 4. When in this position, it can be seen that the end faces 66a and 68a on the valve body 12a are separated from the flange portions 118a on the seal assemblies 112a and 112b. The reasons for such separation is that the seal assemblies 112a and 112b have moved relatively apart with the elongation of the valve housing 16.

The relative movement of the seal assemblies 112a and 112b occurs due to their engagement with the surfaces 38 and 42 in the valve housing 16. Also, the differential area on the seal assemblies 112a and 112b, as defined by the O-ring seals 122a and 128a, is exposed to fluid pressure in the valve body 12a forcing the seal assemblies 112a and 112b relatively apart and toward the surfaces 28 and 30.

As can be appreciated, the greater area of the seal assemblies 112a and 112b exposed to the fluid pressure lies relatively inwardly, that is, toward the bore 70a, whereby the fluid pressure augments the mechanical force holding the seal assemblies 112a and 112b in engagement with the surfaces 28 and 30 in the valve housing 16. Manifestly, in such position, the O-ring seals 128a are maintained in sealing engagement with the surfaces 28 and 30, thereby preventing leakage from the valve 10a.

When the valve 10a is closed, that is, when the valve member 76 is moved to the position wherein the port 78 is disposed at a right angle relative to the opening 18 as illustrated in FIG. 4, fluid pressure in the end 20 of the opening 18 exerts a force on the valve member 76 moving the valve member 76 relatively downstream. The downstream movement of the valve member 76 continues until it engages the seal member 132a of the seal body 114a on the downstream seal assembly 112b. When this occurs, it can be seen that a fluid-tight downstream seal is formed in the valve 10a, thereby providing complete closure of the valve. If the fluid pressure becomes sufficiently high in the valve 10a, the valve housing 16 elongates placing the components of the valve 10a in the position illustrated in FIG. 4.

As previously described, the O-ring seals 128a carried by the upstream and downstream seal assemblies 112a and 112b are maintained in sealing engagement with the surfaces 28 and 30 on the valve housing 16 due to their engagement with the shoulders 38 and 42 of the valve housing 16 and due to the force exerted by the fluid pressure on the differential area seal assemblies.

It should also be pointed out that no fluid can escape between the valve body 12a and the seal assemblies 112a and 112b due to the sealing engagement of the O-ring seals 122a with the valve body 12a in the bore 70a. Thus, the structure of the valve 10a described provides a valve wherein complete closure can be obtained when the valve member 76 is in the closed position and, even though elongation of the valve housing 16 has occurred, effectively prevents the escape of fluid from the valve.

Figures 5, 6:
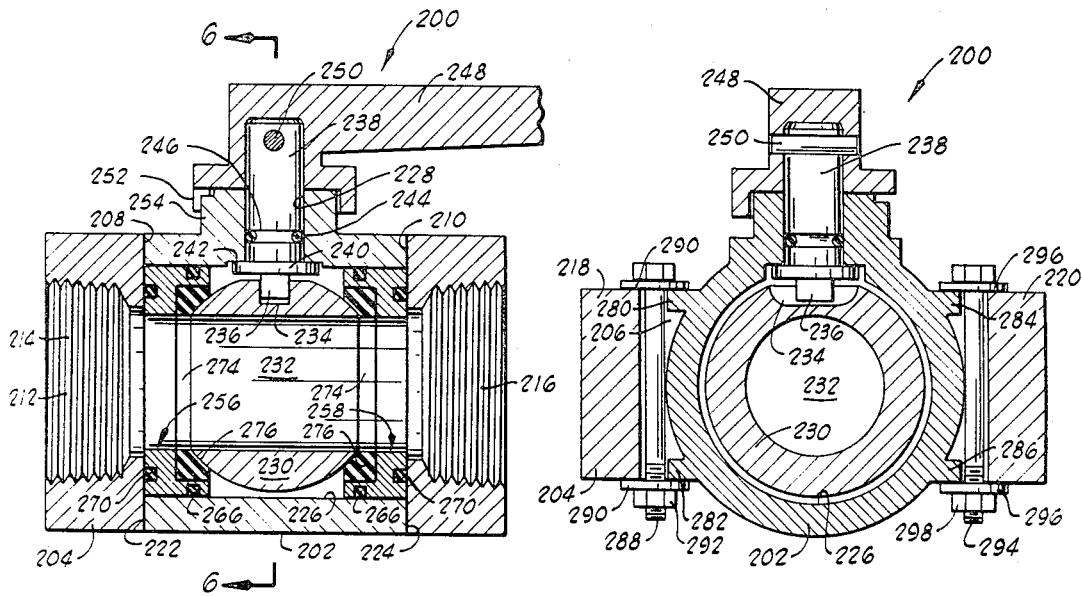
FIG. 5 is a vertical cross-sectional view illustrating still another embodiment of ball valve also constructed in accordance with the invention.
FIG. 6 is a transverse cross-sectional view taken substantially along the line 6—6 of FIG. 5.

*Embodiment of FIG. 5*

The vertical cross-sectional view of FIG. 5 illustrates another embodiment of the valve generally designated by the reference character 200 and also constructed in accordance with the invention. As shown therein, the valve 200 includes a valve body 202 disposed within a valve housing 204.

The valve housing 204 is provided with a cavity 206 (see FIG. 6) forming opposed surfaces 208 and 210 (see FIG. 5) that are disposed generally perpendicularly to an opening 212 that extends therethrough. The opening 212 is provided with an upstream end 214 that is partially threaded for connection with a section of conduit (not shown) and a downstream end 216 that is also partially threaded for connection with a section of conduit (not shown). Manifestly, the ends 214 and 216 may be arranged for connection in any suitable manner. As shown in FIG. 6, the valve housing 204 includes a pair of elongated side portions 218 and 220 that extend along and define the sides of the cavity 206.

The valve body 202 includes an upstream end face 222 facing the surface 208 on the valve housing 204, a downstream end face 224 facing the surface 210 on the valve housing 16, and a bore 226 that extends through the valve body 202 intersecting the end faces 222 and 224. An opening 228 extends transversely through the valve body 202 intersecting the bore 226.

A valve member 230, which is illustrated as being of spherical configuration, is disposed in the bore 226 and has a port 232 extending therethrough. The exterior surface of the valve member 230 is provided with a rectangular recess 234 that is sized to receive a lower rectangular end 236 of a valve operating member 238. As may be seen by comparing FIGS. 5 and 6, the recess 234 is longer in one dimension than the rectangular end 236 to permit movement of the valve member 230 relatively along the bore 226 when the valve member 230 is in the closed position (not shown).

The valve operating member 238 is disposed in the opening 228 and also includes a flange portion 240 that is in engagement with a downwardly facing surface 242 in the valve body 202 to limit the upward movement of the valve operating member 238 relative to the valve body 202. An O-ring seal 244 is disposed in an annular recess 246 formed in the valve operating member 238. The O-ring seal 244 is in sealing engagement with the valve body 202 in the opening 228 to prevent flow of fluid thereby.

The upper end of the operating member 238 is connected with an operating handle 248 by a pin 250. The handle 248 is provided with a lug 252 that is engageable with one or more spaced abutments 254 (only one is shown in FIG. 5) on the valve body 202 to limit the rotational movement of the valve handle 248 and the interconnected valve member 230 to approximately 90°.

The valve 200 also includes an upstream seal assembly 256 and a downstream seal assembly 258. As clearly shown in FIG. 5, the upstream and downstream seal assemblies 256 and 258 are identical in construction though oppositely disposed in the valve 200. In view of the identity of construction of the seal assemblies 256 and 258, only the upstream seal 256 will be described in detail, it being understood that like reference characters will be applied to like parts of the downstream seal assembly 258.

Figure 5A:
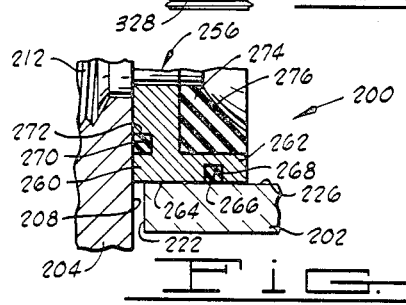
FIG. 5A is an enlarged, fragmentary cross-sectional view of a portion of the valve illustrated in FIG. 5.

The fragmentary cross-sectional view of FIG. 5A illustrates the construction of the seal assembly 256 in detail. As shown therein, the seal assembly 256 includes a relatively rigid seal body 260 having an axial flange portion 262 extending into the bore 226 of the valve body 202. An outer periphery 264 on the seal body 260 is sized to slidingly fit within the bore 226.

An O-ring seal 266 is located in an annular recess 268 formed in the seal body 260 adjacent the outer periphery 264 thereof. The O-ring seal 266 is in sliding and sealing arrangement with the valve body 202 in the bore 226.

An O-ring seal 270 is located in an annular recess 272 also formed in the seal body 260, but disposed adjacent the surface 208 of the valve housing 204. The O-ring seal 270 is in sealing engagement with the surface 208 and has an outside diameter smaller than the diameter of the O-ring seal 266 and only slightly larger than the opening 212 thereby defining a differential area on the seal assembly 256.

An annular seal member 274 is carried by the seal body 260. A surface 276 on the seal member 274 is arranged to sealingly engage the exterior surface of the valve member 230 as illustrated in FIG. 5.

As illustrated in FIG. 6, the valve body 202 also includes a pair of spaced tab portions 280 and 282 that extend outwardly into the cavity 206 adjacent the side portion 218 of the valve housing 204. Similarly, a pair of tab portions 284 and 286 extend outwardly from the opposite side of the valve body 202 into the cavity 206 toward the side portion 220 of the valve housing 204. It will be noted therein that the tab portions 280, 282, 284, and 286 are arranged so that a respective surface thereon is disposed in the same plane as the upper and lower surfaces on the side portions 218 and 220 of the valve housing 204.

A threaded fastener 288 extends through the cavity 206 between the tab portions 280 and 282 and the side portion 218. The fastener 288 is provided with a washer or shoulder 290 at each end thereof that engage both the side portion 218 and the tabs 280 and 282, whereby tightening of a nut 292 on the threaded fastener 288 holds the washers 290 in tight engagement with the side portion 218 of the valve housing 204 and the valve body 202.

Similarly, a threaded fastener 294 extends through the cavity 206 between the tab portions 284 and 286 and the side portion 220. Washers or shoulders 296 on the threaded fasteners 294 are disposed in engagement with the tab portions 284 and 286 and the side portion 220 of the valve housing 204, whereby tightening of a nut 298 on the threaded fastener 294 engages both the tabs 284 and 286 and the side portion 220. Thus, the valve body 202 is retained in the cavity 206 of the valve housing 204 by the threaded fasteners 288 and 294.

*Operation of the embodiment of FIG. 5*

With the valve body 202 disposed in the cavity 206 of the valve housing 204 and the threaded fasteners 288 and 294 inserted therein and tightened, the valve body 202 is retained in the valve housing 204. When the valve member 230 is in the open position, that is, in the position illustrated in FIGS. 5 and 6, fluid flows through the valve 200.

It will be noted in FIG. 5 that the annular seal members 274 are arranged so that the surfaces 276 thereon engage the exterior of the valve member 230 retaining it in a centered position in the valve body 202. The components of the valve 200 remain in the position illustrated until the fluid pressure therein increases sufficiently to elongate the valve housing 204.

When this occurs, the end faces 222 and 224 are spaced from the surfaces 208 and 210 of the valve housing 204 substantially as illustrated in FIG. 5A. Also as shown in FIG. 5A, the O-ring seal 270 remains in sealing engagement with the surface 208 on the valve housing 204 since the effect of fluid pressure in the valve body 202 is to force the seal assemblies 256 and 258 relatively apart, that is, relatively toward the respective surface 208 or 210 on the valve housing 204.

Manifestly, no fluid can escape from the valve 200 between the seal assemblies 256 and the valve housing 204 due to the sealing engagement of the O-ring seals 270 therewith. Also, no fluid can escape from the valve 200 between the valve body 202 and the seal assemblies 256 and 258 due to the sealing engagement of the O-ring seals 266 carried thereby with the valve body 202 in the bore 226.

When the valve 200 is closed (not shown), that is, when the valve member 230 is rotated until the port 232 therein is disposed at a right angle relative to the bore 226, fluid pressure in the end 214 of the opening 212 exerts a force on the valve member 230 moving it relatively downstream. The downstream movement of the valve member 230 continues until the valve member 230 engages the annular seal member 274 carried by the downstream seal assembly 258. When this occurs, a fluid-tight downstream seal is formed in the valve 200 to provide complete closure of the valve 200.

If the fluid pressure in the valve becomes sufficiently high, the valve housing 204 elongates as previously described. Also as previously described, the seal assemblies 256 and 258 are moved relatively toward the surfaces 208 and 210 on the valve housing 204 to maintain the O-ring seals 270 in sealing engagement therewith. Thus, it can be appreciated that the valve 200 provides a complete shut-off, and, simultaneously, eliminates any possibility of leakage between the seal assemblies 256 and 258 and the valve housing 204 and the valve body 202 in the event that elongation of the valve housing 204 occurs.

Figures 7, 8:
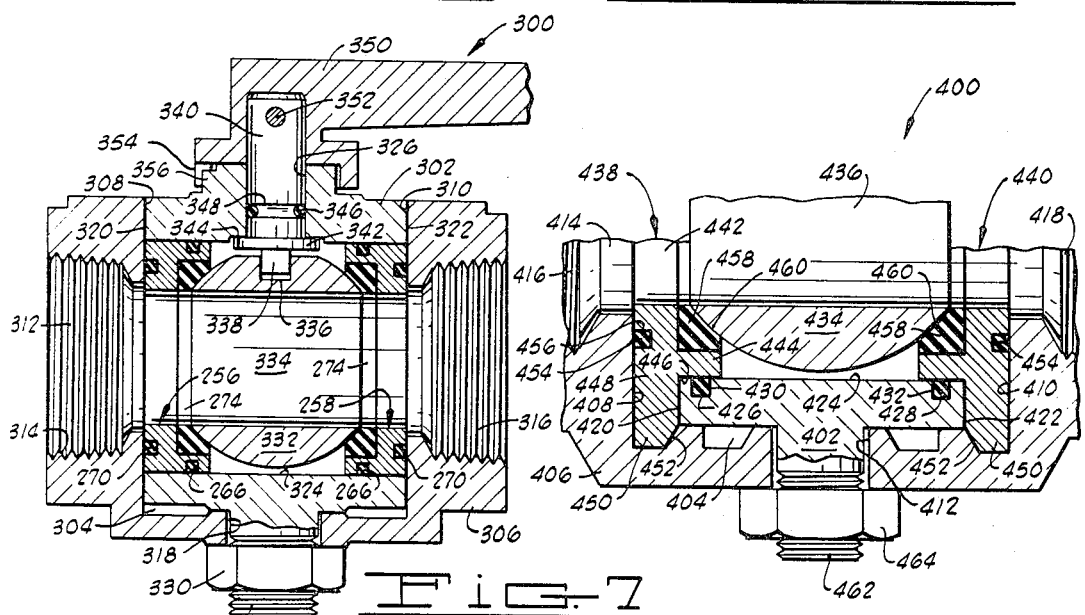
FIG. 7 is a vertical cross-sectional view illustrating a further embodiment of ball valve also constructed in accordance with the invention; and, FIG. 8 is an enlarged, fragmentary cross-sectional view showing an additional embodiment of ball valve also constructed in accordance with the invention.

*Embodiment of FIG. 7*

FIG. 7 illustrates another embodiment of valve also constructed in accordance with the invention and generally designated by the reference character 300. As illustrated therein, the valve 300 includes a valve body 302 disposed in a cavity 304 formed in a valve housing 306.

The valve housing 306 has a surface 308 defining one end of the cavity 304 and a surfaces 310 defining the other end of the cavity 304. The surfaces 308 and 310 are disposed generally perpendicularly to an opening 312 that extends through the housing 306. The opening 312 has a partially threaded inlet or upstream end 314 and a partially threaded downstream end 316. The housing 306 is also provided with an opening 318 that extends transversely to the opening 312 for purposes that will be described more fully hereinafter.

The valve body 302 includes an upstream end face 320 facing the surface 308 on the valve housing 306, and end face 322 facing the surface 310 on the valve housing 306, and a bore 324 that extends therethrough intersecting the end faces 320 and 322. An opening 326 extends transversely through the valve body 302 intersecting the bore 324.

The valve body 302 also includes a threaded stud portion 328 that projects therefrom through the opening 318 in the valve housing 306. A threaded nut 330 is disposed in threaded engagement with the stud 328 and engages the valve housing 306 to retain the valve body 302 therein.

A valve member 332, which is illustrated as being of spherical configuration, is disposed in the bore 324 and has a flow port 334 extending therethrough. A rectangular recess 336 formed in the exterior of the valve member 332 is sized to receive a rectangular lower end 338 on a valve operating member 340 as previously described in connection with the embodiments of FIG. 1 and FIG. 5.

The valve operating member 340 extends through the opening 326 in the valve body 302 and includes an exterior flange 342 that is in engagement with a downwardly facing surface 344 in the valve body 302 to limit the upward movement of the valve operating member 340 relative to the valve body 302.

An O-ring seal 346 is disposed in an annular groove 348 formed in the valve operating member 340. The O-ring seal 346 is in sealing engagement with the valve body 302 in the opening 326.

The upper end of the valve operating member 340 is connected with a valve operating handle 350 by a pin 352. The handle 350 includes a lug 354 that is engageable with one or more projecting abutments 356 on the valve body 302 to limit the rotational movement of the handle 350 and the interconnected valve member 332 to approximately 90°.

Slidingly disposed in the bore 324 of the valve body 302 are the previously described seal assemblies 256 and 258. The seal assemblies 256 and 258 are identical in construction though oppositely disposed in the valve 300. The seal assemblies 256 and 258 have been described in detail in connection with the embodiment of FIG. 5 and will not be described further.

It should, however, be pointed out that the seal assemblies 256 include the O-ring seals 266 that are disposed in the bore 324 of the valve 300 in sealing engagement with the valve body 302 therein. Also, the seal assemblies 256 and 258 each include the O-ring seal 270 that is of smaller diameter than the O-ring seals 266. The seals 270 are disposed in sealing engagement with the surfaces 308 and 310 of the valve housing 306. The annular seal members 274, carried by the seal assemblies 256 and 258, are arranged to engage the exterior surface of the valve member 332 as previously described in connection with the valve 200.

With respect to the operation of the valve 300, it can be appreciated by comparing FIGS. 5 and 7 that the valve 300 functions precisely as described in connection with the valve 200. However, it should be pointed out that the primary distinction between the embodiments illustrated is in the structural arrangement of the valve housing 306 and the valve body 302 as related to the method of retaining the valve body 302 in the housing 306.

*Embodiment of FIG. 8*

The fragmentary cross-sectional view of FIG. 8 illustrates another embodiment of valve generally designated by the reference character 400 and also constructed in accordance with the invention. It will be understood that the valve 400 includes the necessary operating components as previously described in connection with the other embodiments of the valve that were also constructed in accordance with the invention. As illustrated therein, the valve 400 includes a valve body 402 disposed in a cavity 404 formed in a valve housing 406.

The valve housing 406 includes a surface 408 defining one end of the cavity 404 and a surface 410 defining the other end of the cavity 404. An opening 412 extends transversely through the lower portion of the valve housing 406 for purposes that will become more apparent hereinafter.

The valve housing 406 is also provided with an opening 414 that extends therethrough intersecting the surfaces 408 and 410. The opening 414 includes an upstream end 416 that is partially threaded and a downstream end 418 that is also partially threaded.

The valve body 402 includes an upstream end face 420 facing the surface 408 of the valve housing 406, an end face 422 facing the surface 410 on the valve housing 406, and a bore 424 that extends therethrough intersecting the end faces 420 and 422. O-ring seals 426 and 428 are disposed in annular recesses 430 and 432, respectively, formed in the valve body 402 adjacent the bore 424.

A valve member 434, which is illustrated as being spherical in configuration, is disposed in the bore 424 and has a flow port 436 extending therethrough. As previously mentioned, the valve member 434 is interconnected with the necessary operating components as described in connection with the other embodiments of valves.

Upstream and downstream seal assemblies 438 and 440 are disposed in the valve 400. As clearly shown in FIG. 8, the seal assemblies 438 and 440 are identical in construction though oppositely disposed therein. In view of the identity of construction of the seal assemblies 438 and 440, only the upstream seal 438 will be described in detail, it being understood that like reference characters will be applied to like parts in the downstream seal assembly 440.

The upstream seal assembly 438 includes a seal body 442 that is preferably constructed from a relatively rigid material. The seal body 442 includes an axial flange portion 444 having an outer periphery 446 sliding disposed in the bore 424 of the valve body 402.

A radially extending flange portion 448 of the seal assembly 438 is disposed between the surface 408 on the valve housing 406 and the end face 420 on the valve body 402. An arcuate portion 450 on the radially extending flange portion 448 includes a beveled shoulder that engages a beveled surface 452 in the valve housing 406.

An O-ring seal 454 is disposed in an annular recess 456 formed in the seal body 442 adjacent the surface 408. The O-ring seal 454 is in sealing engagement with the surface 408 and has an outside diameter smaller than the diameter of the bore 424 whereby a differential area is formed on the seal assembly 438.

An annular seal member 458 is carried by the seal body 442 adjacent the valve member 434. A surface 460 on the annular seal member 458 is arranged to sealingly engage the exterior surface of the valve member 434.

The valve body 402 and the seal assemblies 438 and 440 are retained in the valve housing 406 by a threaded stud portion 462 that projects from the valve body 402 through the opening 412 in the valve housing 406. The threaded stud portion 462 is in engagement with a threaded nut 464 that also engages the valve housing 406 to securely retain the valve body 402 in the housing 406.

It can be appreciated that the tightening of the threaded nut 464 pulls the valve body 402 downwardly in the cavity 404 of the valve housing 406, whereby the seal assemblies 438 and 440 engage the beveled surfaces 452 in the housing 406 to bias the seal assemblies relatively toward the surfaces 408 and 410. Thus, the O-ring seals 454 carried by the seal assemblies 438 and 440 are held in tight sealing engagement with the surfaces 408 and 410 on the housing 406.

Operationally, it can be appreciated that the valve 400 functions as does the valve 10 previously described in connection with FIG. 1. The significant difference between the two embodiments being the method of retaining the valve assembled.

However, it should be emphasized that the structure described in connection with the valve 400 effectively prevents leakage of fluid therefrom in the event that the valve body 406 elongates due to the sealing engagement of the O-ring seals 454 with the valve housing 406 and due to the sealing engagement between the O-ring seals 426 and 428 carried by the valve body 402 with the peripheries 446 of the seal assemblies 438 and 440.

From the foregoing detailed description of the various embodiments, it can be appreciated that a valve constructed in accordance with the invention is effective, not only to provide closure of the valve when desired, but also to prevent the escape of fluid from the valve in the event that elongation of the valve housing occurs. Each of the embodiments described is composed of simply constructed components that can be economically manufactured. Also, since the elongation of the valve housing does not cause fluid leakage from the valve, the valve housing, which remains permanently in the fluid system, can be reduced in thickness thereby reducing the weight and the cost of the valve.

It will be understood that the embodiments described in detail hereinbefore are presented by way of example only and that many modifications and changes can be made thereto without departing from the spirit of the invention or from the scope of the annexed claims.

What I claim is:

1. A valve connectable between sections of a conduit, said valve comprising:
   a valve housing having an opening extending therethrough and a cavity therein intersecting said opening, each end of said opening being arranged for connection to the conduit, said cavity forming a pair of opposed surfaces therein;
   a valve body having a pair of end faces thereon with said end faces disposed generally parallel to said opposed surfaces of said valve housing, said valve body being disposed in said cavity between said opposed surfaces and having a bore extending therethrough substantially in axial alignment with said opening and intersecting said end faces;
   a valve member in said bore movable between a position wherein said bore is open, and a position wherein said bore is closed;
   first seal means encircling a portion of said bore and sealingly engaging said one of said opposed surfaces and said valve body; and
   second seal means encircling a portion of said bore and having a portion thereof slidingly and sealingly disposed therein, said second seal means also sealingly engaging the other opposed surface in said housing along a circumference having a diameter smaller than the diameter of said bore, whereby said second seal means is biased by fluid pressure in said body relatively toward said other surface to maintain said first and second seal means in constant sealing engagement with said opposed surfaces in said housing, each of said first and second seal means comprising:
   a seal body having a portion slidingly disposed in said bore and having a radially outwardly extending flange portion disposed between an end face on said valve body and a respective opposed surface on said housing;
   a first annular groove in said seal body adjacent said valve body in said bore;
   a first annular seal member disposed in said first annular groove sealingly engaging said valve body;
   a second annular groove in said seal body adjacent a respective opposed surface in said housing and having a diameter smaller than the diameter of said bore;
   a second annular seal member disposed in said second annular groove in sealing engagement with a respective opposed surface; and
   a third annular seal member carried by said body arranged to sealingly engage said valve member.

2. A valve connectable between sections of a conduit, said valve comprising:
   a valve housing having
      an opening extending therethrough, each end of said opening being arranged for connection with the conduit,
      a cavity intersecting said opening and forming a pair of opposed surfaces therein,
      an arcuate portion extending relatively into said cavity from each of said opposed surfaces, each of said arcuate portions including an arcuate recess adjacent said cavity having a beveled surface generally facing the adjacent opposed surface on said housing;
   a valve body disposed in said cavity and having a pair of end faces, a bore extending therethrough intersecting said end faces, a beveled, arcuate shoulder portion engaging one of beveled surfaces forcing one of said end faces toward the adjacent opposed surface on said housing, and a seal member encircling said one end face forming a seal between said valve body and housing;
   seal means encircling a portion of said bore and slidingly and sealingly disposed in said bore and having a flange portion disposed between the other end face and the other opposed surface, said flange including a beveled arcuate shoulder portion engaging the other said beveled surface on said housing, force said seal means toward the other opposed surface on said housing, said seal means sealingly engaging said other opposed surface along a circumference smaller than the diameter of said bore, whereby fluid pressure in said valve body biases said seal means toward said other opposed surface;
   a valve member disposed in said bore arranged to sealingly engage said seal means, said valve member being movable between a position opening said bore and a position closing said bore; and,
   connection means engaging said valve body and housing to hold said valve body and housing assembled with said bore and opening in substantial alignment.

3. The valve of claim 2 wherein
   said housing also includes a pair of spaced, upwardly facing surfaces extending generally parallel to said opening;
   said valve body includes a lug portion disposed in juxtaposition with the upwardly facing surfaces of said housing; and,
   said connection means includes a threaded fastener extending through said lug portions and threadedly engaging said housing holding said lug portions and upwardly facing surfaces in juxtaposition thereby retaining said valve body in said cavity.

4. A valve connectable between sections of a conduit, said valve comprising:
   a valve housing having
      an opening extending therethrough, each end of said opening being arranged for connection with the conduit,
      a cavity intersecting said opening and forming a pair of opposed surfaces therein,
      an arcuate portion extending relatively into said cavity from each of said opposed surfaces, each of said arcuate portions including an arcuate recess adjacent said cavity having a beveled surface thereon generally facing the adjacent opposed surface on said housing;
   a valve body disposed in said cavity and having a pair of end faces and a bore extending therethrough intersecting said end faces;
   first and second seal means encircling a portion of said bore and slidingly and sealingly disposed in said bore and each having a flange portion disposed between one end face on said valve body and one of the opposed surfaces on said housing, said flange portions each including a beveled, arcuate shoulder portion engaging the respective beveled surface on said housing forcing each said seal means into sealing engagement with the adjacent opposed surface in said housing, each said seal means sealingly engaging said adjacent opposed surface along a circumference having a diameter smaller than the diameter of said bore, whereby each said seal means is biased toward the adjacent opposed surface on said housing by fluid pressure in said valve body;
   a valve member disposed in said bore arranged to sealingly engage said seal means, said valve member being movable between a position opening said bore and a position closing said bore; and
   connection means engaging said valve body and housing to hold said body and housing assembled with said bore and opening in substantial alignment.

5. The valve of claim 4 wherein each said seal means also includes:
   a relatively rigid seal body;
   a first annular seal member carried by said seal body and slidingly and sealingly engaging said valve body in said bore;

a second annular seal member carried by said seal body and sealingly engaging a respective one of the opposed surfaces on said housing and having a diameter smaller than the diameter of said first annular seal member; and, a third annular seal member carried by said seal body arranged to sealingly engage said valve member.

6. A valve connectable between sections of a conduit, said valve comprising:

a valve housing having an opening extending therethrough and a cavity therein intersecting said opening, each end of said opening being arranged for connection with the conduit, said cavity forming a pair of opposed surfaces therein, said housing also including a pair of spaced, upwardly facing surfaces and a pair of spaced, downwardly facing surfaces extending generally parallel with said opening;

a valve body disposed in said cavity and having a pair of end faces adjacent the opposed surfaces in said housing, a bore extending therethrough intersecting said end faces, and a pair of spaced lug portions projecting outwardly from each side thereof in alignment with the upwardly and downwardly facing surfaces on said housing;

a valve member disposed in said bore and movable between a position closing said bore and a position wherein said bore is open;

a pair of annular seal means slidingly and sealingly disposed in said bore, each said seal means sealingly engaging one of the opposed surfaces on said housing along a circumference smaller than the diameter of said bore, whereby fluid pressure in said bore biases said seal means toward the adjacent one of said opposed surfaces; and, connecting means engaging the upwardly and downwardly facing surfaces on said housing and the lug portions on said valve body to hold said valve body and housing assembled with said bore and opening in substantially axial alignment.

7. The valve of claim 6 wherein each of said seal means includes:

a relatively rigid seal body;

a first annular seal member carried by said seal body slidingly and sealingly engaging said valve body in said bore;

a second annular seal member carried by said seal body sealingly engaging a respective one of said opposed surfaces in said housing, said second annular seal member being of smaller diameter than said first seal member; and, a third annular seal member carried by said seal body arranged to sealingly engage said valve member.

8. A valve connectable between sections of a conduit, said valve comprising:

a valve housing having an opening extending therethrough and having a cavity therein intersecting said opening, each end of said opening being arranged for connection to one of said conduit sections, said cavity forming a pair of opposed, substantially parallel surfaces in said housing;

a rigid valve body disposed in said cavity between said opposed surfaces and having a cylindrical bore extending therethrough substantially in axial alignment with the opening extending through said housing, said rigid valve body having an upstream end face, a downstream end face, said cylindrical bore intersecting said end faces, said end faces of said rigid valve body being disposed generally parallel to said surfaces;

a valve ball disposed in said bore and having a port extending therethrough, said valve ball being rotatable in said bore from an open position wherein said port is aligned with said bore to a closed position wherein said port is disaligned with respect to said bore, said valve ball being movable relatively along said bore when said valve ball is in the closed position;

a first relatively rigid annular seal body encircling a first portion of said bore and having a first portion extending axially in said bore and slidable axially in said bore, and further having a second portion extending radially inwardly relative to said bore and contacting one of the opposed surfaces formed by said cavity in said valve housing from the opening through said housing outwardly toward said body, said first portion having a first annular groove therein adjacent said valve body and spaced axially inwardly in said bore from the upstream end face of said valve body by a distance greater than the distance which the nearest of said opposed surfaces of said valve housing may move axially away from said valve body during expansion of said housing in operation of the valve whereby said first opposed surface of said valve housing can move axially away from said valve body followed by said first rigid annular seal body without said first annular groove leaving said bore, and said second portion having a second annular groove therein adjacent, and facing, the nearest of said opposed surfaces of said valve housing, said second annular groove defining an area within it which is less than the cross-sectional area of said bore whereby the force resulting from fluid pressure acting on said first, relatively rigid annular seal body from inside said valve body will be greater than the force resulting from fluid pressure acting from outside said body on the portion of said first relatively rigid annular seal body located radially inwardly of said second groove;

a first resilient seal member in said first groove sealingly engaging said valve body and slidable in said bore with said first portion of said first rigid annular seal body;

a second resilient seal member in said second groove sealingly engaging the nearest of said opposed surfaces of said valve housing;

a valve ball resilient seal member secured to said first relatively rigid annular seal body and positioned thereon for sealingly contacting said valve ball while concurrently spacing said first relatively rigid annular seal body from said valve ball;

a second relatively rigid annular seal body encircling a second portion of said bore and having a first portion extending axially in said bore and slidable axially in said bore, and further having a second portion extending radially inwardly relative to said bore and contacting the nearest one of said opposed surfaces of said valve housing from said opening through said valve housing radially outwardly toward said valve body, said first portion of the second relatively rigid annular seal body having a first annular groove therein adjacent said valve body and spaced axially inwardly in said bore from the downstream end face of said valve body by a distance which is greater than the distance in an axially direction which the nearest one of said opposed surfaces of said valve housing will move from said valve body in undergoing expansion during operation of said valve whereby the nearest one of said opposed surfaces of said valve housing can move axially away from said valve body followed by said second rigid annular seal body without the first annular groove therein leaving said bore, and said second portion of said second relatively rigid annular seal body having a second annular groove therein adjacent and facing the nearest one of the opposed surfaces of said valve housing, said second annular groove in said second relatively rigid annular seal body defining an area within it which is less than the cross-sectional area of said bore whereby the force resulting from fluid pressure acting on said second relatively rigid annular member from inside said valve body will be greater than the force resulting from fluid pressure acting from outside said valve body on the portion of said second relatively rigid annular seal body located relatively inwardly of the second groove in said second relatively rigid annular seal body;

a third resilient seal member in the first groove in said second relatively rigid annular seal body sealingly engaging said valve body and slidable in said bore with said first portion of said second relatively rigid annular seal body;

a fourth resilient seal member in said second groove of said second relatively rigid annular seal body sealingly engaging the nearest one of the opposed surfaces of said valve housing; and an additional valve ball resilient seal member secured to said second relatively rigid annular seal body and positioned thereon for sealingly contacting said valve ball while concurrently spacing said second relatively rigid annular seal body from said valve ball.

References Cited

UNITED STATES PATENTS

| | | | |
|---|---|---|---|
| 2,895,496 | 7/1959 | Sanctuary | 251—317 XR |
| 2,963,262 | 12/1960 | Shafer | 251—315 XR |
| 3,056,577 | 11/1962 | Kulisek | 251—315 |
| 3,150,681 | 9/1964 | Hansen | 137—454.2 |
| 3,156,475 | 11/1964 | Gerard | 277—58 |
| 3,157,380 | 11/1964 | Sivyer | 251—315 XR |
| 3,182,952 | 5/1965 | Montesi | 251—148 |
| 3,199,528 | 8/1965 | Oetjens | 251—316 XR |
| 3,202,175 | 8/1965 | Dumm | 137—454.2 |
| 3,211,421 | 10/1965 | Johnson | 251—315 |

ALAN COHAN, *Primary Examiner.*

H. W. WEAKLEY, *Assistant Examiner.*